Nov. 21, 1950 — R. A. ARTHUR ET AL — 2,531,100

REGULATOR

Filed Sept. 29, 1947 — 4 Sheets-Sheet 1

INVENTORS
ROBERT A. ARTHUR
JAMES M. KEMPER

BY
ATTORNEY

INVENTORS
ROBERT A. ARTHUR
JAMES M. KEMPER
BY
ATTORNEY

Nov. 21, 1950 R. A. ARTHUR ET AL 2,531,100
REGULATOR
Filed Sept. 29, 1947 4 Sheets-Sheet 3
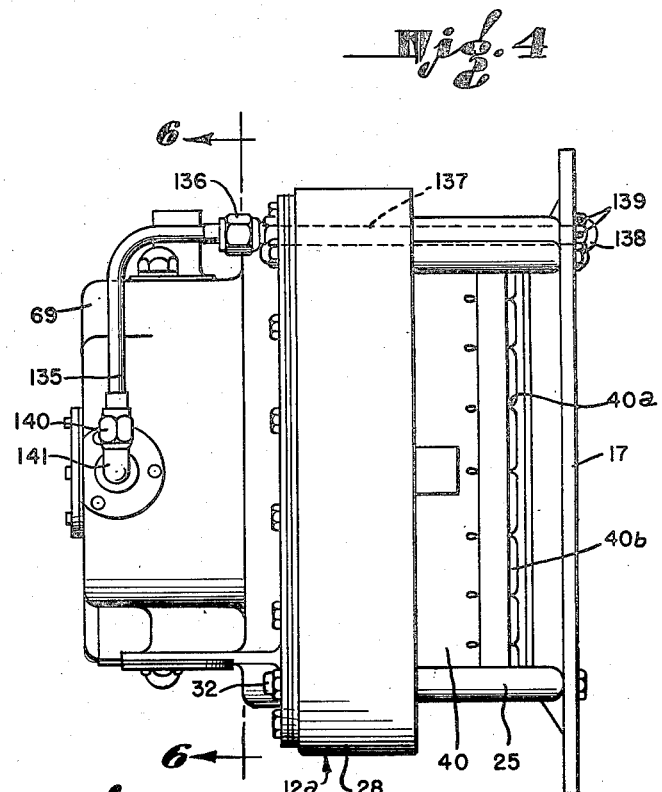
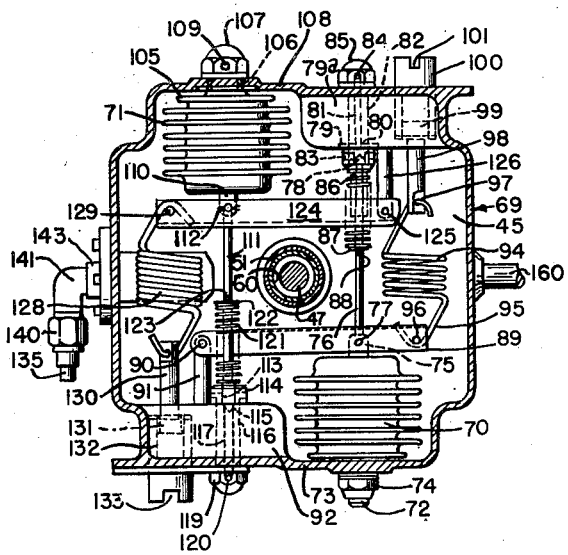
INVENTORS
ROBERT A. ARTHUR
JAMES M. KEMPER
BY
ATTORNEY

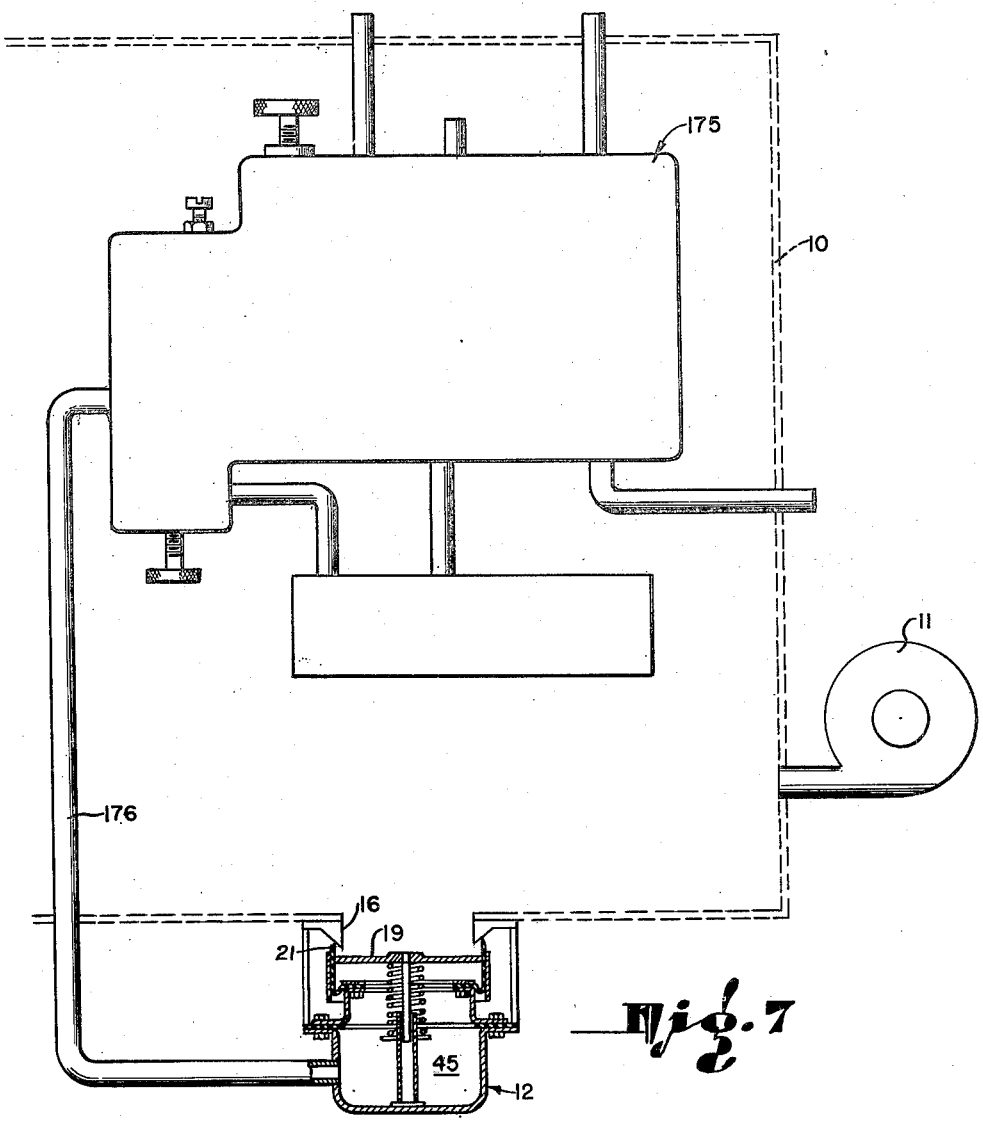

Patented Nov. 21, 1950

2,531,100

UNITED STATES PATENT OFFICE 2,531,100

REGULATOR

Robert A. Arthur, Santa Monica, and James M. Kemper, Hollywood, Calif., assignors to The Garrett Corporation, Los Angeles, Calif., a corporation of California Application September 29, 1947, Serial No. 776,842

11 Claims. (Cl. 98—1.5)

This invention relates generally to means of controlling the pressurized ventilation of an enclosure or compartment, and relates more particularly to means for maintaining a desired air pressure within said enclosure.

While the invention has particular utility in connection with pressurized ventilation in aircraft cabins and the like, and is shown and described embodied in such an installation, it is to be understood that its utility is not confined thereto, and it is to be further understood that the term "aircraf," as used herein, refers to any type of device that travels through the earth's atmosphere.

Generally, in cabin pressurizing and ventilating systems, there is means, such as an air pump or supercharger, for supplying air under pressure to the cabin, with one or more control valves for controlling the outflow of air from a discharge or outlet duct or ducts, and it is an object of the present invention to provide an improved cabin pressurizing and ventilating system wherein there are a plurality of air discharge ducts controlled by valve means, each of which is, in turn, under control of a master regulating system.

There have been cabin pressurizing and ventilating systems proposed having a plurality of valve controlled outlets for exhausting air from the cabin to atmosphere, under the control of cabin pressure and differential pressure responsive control devices. By making the outlet of sufficient area, the entire outflow of an aircraft cabin can be controlled by one or two of such regulators. However, where only one or two regulators are employed, the areas within the cabin more remote from such regulators will not be as well ventilated as the areas near the regulators, and the air in such remote areas will tend to become more or less stagnant.

It is therefore another object of the invention to provide a ventilation system which will avoid this condition, i. e., a system which will give fairly uniform ventilation throughout the interior of an aircraft cabin. Accordingly, the invention embodies the concept of employing an adequate number of outflow control valves sufficiently distributed throughout the area of the cabin enclosure to provide adequate distribution of outflow to attain uniformity of ventilation.

As the mechanism of a pressure regulator for controlling the outflow valves is somewhat complicated and quite delicate, such mechanism may require supervision, adjustment, and servicing from time to time, so as to maintain it in proper operating condition, and this may involve considerable expense.

It is therefore still another object of this invention to provide a pressurizing and ventilating system in which the necessity for servicing a large number of control mechanisms is eliminated.

A further object is to provide a system of this character that is relatively inexpensive so that an aircraft cabin may be equipped with adequate ventilation and pressure control at relatively low cost.

Assuming the use of a fairly large number of control mechanisms in a single aircraft cabin, any derangement of one of such mechanisms could throw the entire control system out of balance. To locate the improperly operating control device might necessitate testing all of the control devices in the cabin.

It is a still further object of the invention to provide a multiple outlet control system in which the control mechanism can be quickly and readily adjusted so as to provide uniform control at all of the outlets.

The utilization of only one or two control outlets would require such outlets to be of large size in order to handle the volume of outflow required for adequate ventilation. Such large units would be much more expensive to manufacture than smaller units, and it is another object of the invention to provide a control system utilizing a number of relatively small outlet valves of relatively simple and inexpensive construction.

Another object of the invention is to provide a system of this character which is relatively simple in construction and reliable in operation.

It is still another object of the invention to provide a device of this character wherein there is a valve controlling the outflow of air, including a movable valve member subjected to fluid pressure on opposite sides thereof, and a valve seat therefor, said valve being so constructed and arranged that there is substantially no variation in the effective pressure area of said movable valve member with respect to its various operative positions.

A further object of the invention is to provide a valve of this character wherein the ambient or atmospheric pressure has substantially no effect on said movable valve member.

Other objects and advantages of the invention will appear from the following part of the specification.

Referring to the drawings, which are for illustrative purposes only,

Fig. 4 is a side view of the same;

Fig. 6 is a sectional view through the control mechanism taken on line 6—6 in Fig. 4; and Fig. 7 is a diagrammatic view showing an alternative arrangement of the invention.

Figure 1:
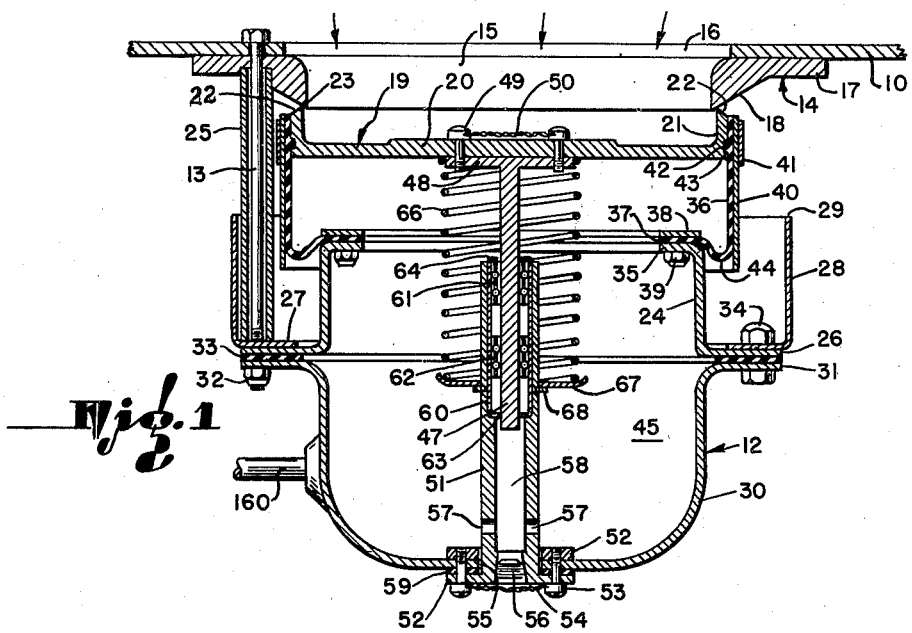
Fig. 1 is a sectional view taken on line 1—1 in Fig. 2 showing an outlet control valve constructed in accordance with the present invention.
Figure 2:
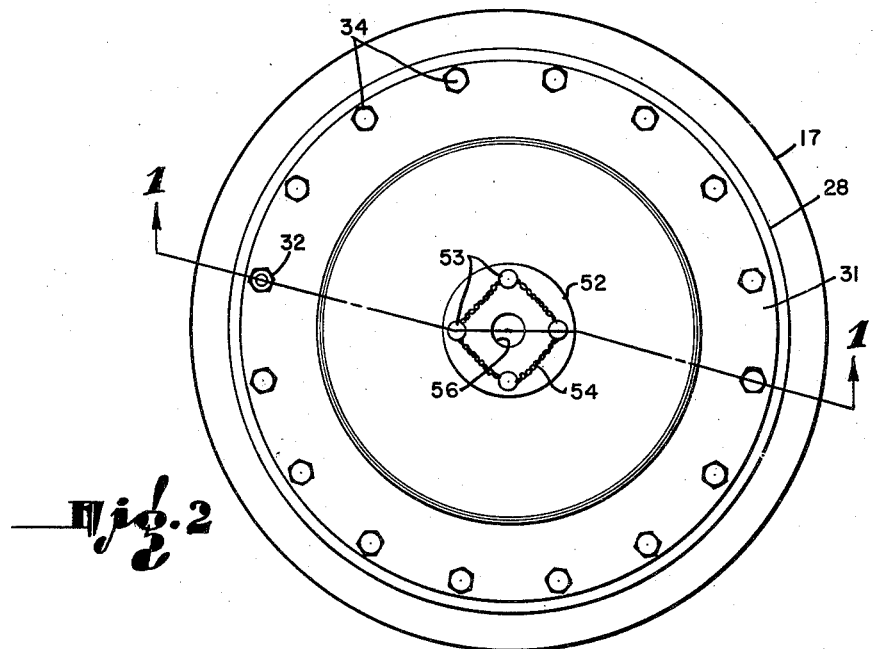
Fig. 2 is an end view of said valve.
Figure 3:
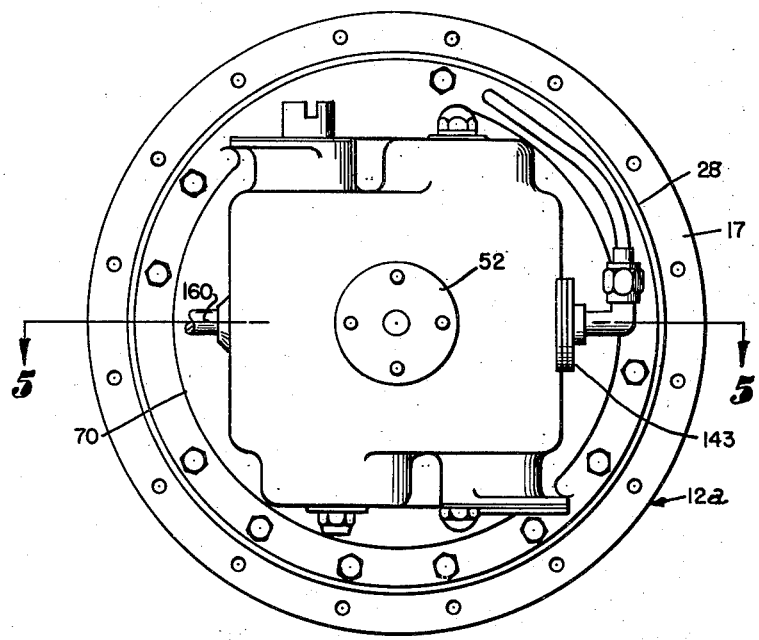
Fig. 3 is an end view of an alternative arrangement of the valve wherein the regulating or control mechanism is embodied in the valve unit.

Referring to Figs. 1 and 2, there is shown a wall 10 of an aircraft cabin which is supplied with a flow of ventilating air in the usual manner by any suitable means, such as an air pump or supercharger 11 (Fig. 7) driven by the aircraft engine or other suitable means. A flow valve assembly, indicated generally at 12 and hereinafter called the slave valve unit, is secured to the outer side of the wall 10 by means of bolts 13, and the unit includes a valve inlet member 14, having a port 15 therethrough which registers with an outlet opening 16 in wall 10 and is positioned in the ambient atmosphere or any space of lesser pressure than the cabin, as for example a bomb bay, wheel well or duct. Valve inlet member 14 is itself formed as a base ring or flange 17 with a thickened portion 18 defining the central opening or port 15 and exteriorly shaped as a truncated cone. The latter provides a sloping seat for a movable poppet type valve, indicated generally at 19. The bolts 13, previously referred to, pass through the flange 17.

Valve member 19 is movable toward and from its seat 18 and is in the general shape of a shallow cup having a bottom wall 20 and a peripheral, axially extending cylindrical wall portion 21, the free end of which is beveled at 22 to provide a relatively narrow or sharp inner edge 23 adapted to contact the oppositely sloping surface of seat 18. The seating surface of the seat 18 is an external frusto-conical surface which slopes outwardly away from the region of engagement by the valve and slopes away from the engagement edge 23 of the valve. By so forming this seat there is a centralizing effect and in additional ample clearance around the seating edge of the valve 19 is provided so that air flowing from the cabin through the valve opening is less likely to produce any undesirable effects which might disturb the positioning of the valve. This construction and arrangement of the movable valve member and its seat provide a valve construction wherein there is substantially no variation in the effective pressure area on the port side of the movable valve member in its various operative positions.

Slave valve unit 12 also includes a centrally located Z-sectioned annular casing member 24 supported in spaced relationship to the ring 17 by spaced sleeves 25 enclosing the bolts 13. Z-sectioned member 24 includes an outwardly extending annular flange 26 formed with holes through which extend the ends of the retaining bolts 13. Lying adjacent flange 26 and held in place by the spacer sleeves 25 is the inturned flange 27 and an annular enclosing collar 28 which extends toward base ring 17 concentrically of member 24. The inner free end 29 of collar 28 is spaced outwardly from the valve inlet member 14 and does not interfere with the free flow of air through the poppet valve 19 when open.

The device is provided with a generally cup-shaped cover 30 having an out-turned annular flange or lip 31 formed with annularly spaced openings through which the threaded ends of the bolts 13 also extend to be secured upon the outer side by nuts 32. As disclosed, a gasket 33 may be provided between the flanges 26 and 31 to insure an air-tight seal. Also, additional clamping or securing means for the flanges may be provided, such as bolts 34, arranged in annularly spaced relationship between bolts 13

Between the side wall 21 of valve member 19 and the in-turned flange 35 at the inner end of Z-sectioned member 24 is a flexible diaphragm 36 generally cylindrical in shape and substantially unresponsive to ambient pressure. One end of the diaphragm 36 encloses the cylindrical wall 21 of the valve member 19 in sealed relationship while the opposite end is in-turned at 37 and clamped to the flange 35 of member 24 by the cooperation of an annular ring-like plate 38 and annularly arranged screws 39. Flange 35 of member 24 is held in spaced relationship to valve inlet member 14 and determines the travel permitted valve member 19 in moving to its open position.

About the exterior of the cylindrical portion of the diaphragm 36 is disposed a diaphragm guide or collar 40, cylindrical in shape and of greater diameter than the cylindrical portion of Z member 24. Collar 40 is provided at its inner end with a plurality of peripherally spaced axially extending slots 40a (Fig. 4) which form tabs 40b. The latter are pressed against the outer face of the adjacent portion of the diaphragm by a ring or band 41 to secure together the valve member 19, diaphragm 36 and collar 40. The outer and free end of collar 40 is disposed about said cylindrical portion of the member 24 in spaced relation thereto. To provide additional securing means and to prevent axial slippage between valve 19 and diaphragm 36 the former is provided with an annular groove 42 in which is received an internal annular rib 43 on the diaphragm.

When the device is assembled, the diaphragm 36 includes a generally U-shaped portion 44 in the space between the member 24 and the collar 40, the latter extending longitudinally beyond said U-shaped portion of the diaphragm so that there is a "rolling" action of the diaphragm between said member 24 and collar 40 with operative movements of the valve member 19. The area of the valve surface adjacent the valve seat 18 and externally of the seat engaging edge 23 and against which atmospheric air may exert force tending to open the valve and the area of the U-shaped portion 44 of the member 24 against which atmospheric air may exert force in a direction tending to close the valve, are substantially the same so that the forces tending to open the valve and the forces tending to close the valve are in balance. By this arrangement the position of the valve is entirely under the control of the pressure within the chamber and a change in atmospheric pressure has no effect on the position of the valve. The valve member 19, diaphragm 36, member 24, and cover 30, define a chamber 45 adapted to be provided with a control pressure effective upon the outer side of valve 19. It will be understood from the foregoing that the effective pressure area of the outer side of the valve member 19 does not vary in the various operative positions of said member.

The valve member 19 is movable axially and to guide it for straight line movement is provided an axial stem 47, to the end flange 48 of which it is secured by means of screws 49. If desired, the screws may have transverse drill holes through their heads for reception of a locking wire 50 to prevent accidental loosening.

Valve stem 47 extends at its free end into the adjacent free end of an aligned fixed tubular sleeve or guide 51. An annular flange or head 52 on the latter is secured to the outer side of the cover 30 by means of screws 53, which, in a manner similar to the screws 49, may be locked against displacement by a locking wire 54.

Sleeve 51 extends into the chamber 45 through an opening 55 in the cover 39, and is provided with a tapped opening 56 at the outer end of its interior bore 58 and with intersecting cross bores 57 forming air passages connecting it interiorly with chamber 45. If desired, a sealing gasket 59 may be interposed between the flange 52 and the adjacent side of the cover 39.

The bore 58 is enlarged at its inner end to receive a ball bearing assembly including a tubular housing 60 with axially spaced ball and race assemblies 61 and 62 disposed therein. The ends of the housing 60 are inturned at 63 and 64, as flanges to prevent displacement of the race assemblies, the former abutting a shoulder at the inner end of the enlarged bore of the sleeve. Valve stem 47 seats slidingly within ball bearing assemblies 61 and 62 and provides for the axial displacement of valve 19 with a minimum of frictional resistance.

Valve member 19 is urged in the closing direction by a relatively light concentric coil spring 66 which at its opposite end abuts its retainer 67 secured exteriorly to fixed sleeve 51 by a retaining ring 68 clipped into a groove provided therefor in the sleeve. When the supercharger 11 is not operating, the valve 19 is held closed by spring 66. Operation of the supercharger, however, creates a pressure head in cabin 10 which acts on the inner face of valve member 19 through opening 16 and port 15, to urge it in the opening direction. An opposing pressure in chamber 45 resists this movement and urges said valve member in the closing direction. By controlling the fluid or air pressure in chamber 45 the extent of valve opening is controlled, as will be hereinafter more fully described.

Referring now to Figs. 3 to 6, inclusive, means are shown for regulating the pressure in the chamber 45 for the purpose of controlling the movement of valve member 19. In the illustrated arrangement the regulating and valve means, indicated generally at 12a and termed a control unit, comprise a single unit, which so far as the valve construction alone is concerned is like the construction described and illustrated in Figs. 1 and 2. For the cover 39 of the valve assembly shown in Figs. 1 and 2, however, a cover 69 is substituted being so formed as to accommodate control mechanism including isobaric and differential pressure sensitive bellows 70 and 71, respectively. The isobaric bellows has an end plate provided with a screw 72 extended through wall 73 of the cover 69 and secured fixedly in position by a nut 74. The inner movable end of the bellows is provided with a projection 75 from which extends a stem 76, the connection being effected by any suitable means such as a pin 77. The opposite end of the stem 76 carries a tapered valve member 78 slidable in a bore provided therefor in a fixed valve member 79, itself mounted in a boss 79a formed in cover 69. Member 79 includes a valve seat 80 connected by an internal passage 81 through its extension 82 and it is the cooperative function of valve 78 and seat 80 to control fluid flow through that passage.

Passage 81 communicates with atmosphere by way of openings 84 in a nut 85 threaded on the end of the extension 82 of valve seat member 79. It also communicates with chamber 45 through transverse cross-passages 83.

Resilient means, shown as a coil spring 86, is disposed about the valve stem 76 and reacts between the fixed valve member 79 and a washer 87 positioned on the stem by means of a pin 88. Spring 86 exerts a force which urges valve member 78 toward its open position.

Figure 5:
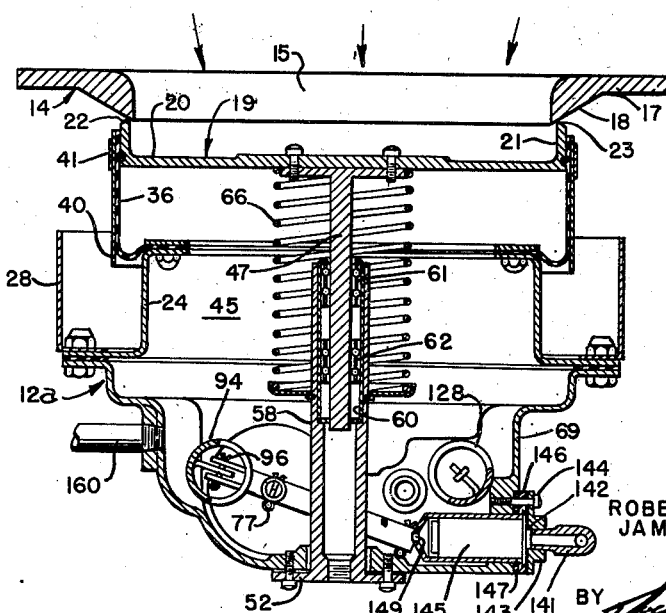
Fig. 5 is a sectional view of the self-contained unit taken on line 5—5 in Fig. 3.

Adjustable means are provided which at all times urge valve member 78 to its closed position in opposition to spring 86. These means as disposed comprise a lever 89 pivoted in cover 69 at 90 upon a supporting member 91 fixed to an inwardly extending boss 92 formed integrally with cover wall 73. Lever 89 is generally U-shaped in cross section with its open side facing wall 73, as shown in Fig. 6, and straddles the boss or projection 75 on isobaric bellows 70 and is pivotally connected thereto by the pin 77, which may be a cotter pin as shown in Fig. 5. The top wall of the lever is suitably cut away to accommodate the valve stem 76 so that both the lever and the stem will be free to assume their necessary operative positions. A spring 94 is received between the side walls of the lever 89, its hooked end 95 engaging a transverse cotter pin 96 carried thereby. The opposite end of the spring 94 is hooked through an opening 97 in an adjustable member 98 having a head 99. The latter is threaded and seats in a rotatable sleeve 100 carried by cover 69 and formed with a tool-receiving slot 101 in its outer end. Rotation of sleeve 100 effects the longitudinal movement of the member 98 and varies the tension of spring 94. This adjustment means may be of the type disclosed in the copending application of James M. Kemper, for a Cabin Pressure Control System, Serial No. 613,794, filed August 31, 1945, now Patent No. 2,463,489.

Differential pressure bellows 71 has an end plate 105 with a hollow threaded stem 106. A nut 107, formed with openings 109, is screwed onto the stem and secures the bellows to a wall 108 of the cover 69, the interior of the bellows connecting to atmosphere through the stem 106 and openings 109. It is to be noted that the cover walls 73 and 108 are opposed and that the bellows 70 and 71 mounted thereon extend inwardly toward each other in chamber 45 but in laterally spaced planes the arrangement being such as to provide a compact unit requiring a minimum of space.

The inner and movable end of the bellows 71 is provided with a boss 110 seating a valve stem 111 secured in place as by a cotter pin 112. The opposite end of the valve stem 111, in a manner similar to valve stem 76, is provided with a tapered valve member 113 extended slidably in a longitudinal bore formed in a fixed valve member 114. The latter is also formed with a valve seat 115 with which valve member 113 cooperates to control the flow of air through the valve to and from chamber 45. The valve member 114 is provided with an extension 116 through which extends a longitudinal passage 117 and which itself extends through an unshown opening through the boss 92 formed integrally with the wall 73. The outer end of extension 116 is threaded for reception of a nut 119 having a laterally extending passage 120 which communicates with the passage 117. Thus, it is seen, the interior of the cover 69 comprising the chamber 45, is in controlled communication with atmosphere.

A coil spring 121 disposed about valve stem 111 and reacting between the fixed valve member 114 and a washer 122 positioned on the stem 111 by a pin 123, at all times urges the valve 113 in the opening direction. Means urging the expansion of bellows 71 and the movement of valve 113 to its closed position is provided and include a lever 124 pivoted adjacent one end at 125 to a rigid support member 126 fixed to the boss 79a. Lever 124 is shaped similarly to the lever 89 and is secured to the boss 110 of bellows 71 by means of the pin 112. One end of a spring 128 is attached to the free end of lever 124 by means of a pin 129, its other end being attached to a longitudinally movable member 130 having a threaded head 131 threadably received in an internally threaded bore of a sleeve 132 rotatable in boss 92 and slotted at 133 at its outer end for angular adjustment. This adjustment means is similar to that provided for adjusting the effective force of spring 94.

It is to be noted that the valve 78 controls communication between the chamber 45 and atmosphere, and that the valve 113 also controls communication between said chamber and atmosphere. The operation of this mechanism will be hereinafter described.

The chamber 45 is connected to the cabin by suitable means shown as including a conduit 135 provided at one end with a suitable fixture 136 connected to a hollow bolt 137 substituted for one of the bolt 13 and spacer sleeve 25 assemblies of Fig. 1. Bolt 137 extends into the cabin where its threaded end seats a nut 138 having openings 139 connecting the interior longitudinal bore of the bolt with the interior of the cabin. The end of conduit 135 adjacent cover 69 is provided with a fixture 140 for attachment to a second fixture 141 the threaded end of which is screwed into a bore 142 of a plate 143 attached to the cover by means of screws 144. The plate 143 is disposed over an opening in cover 69 in which is received a tubular filter 145 having a flange 146 at its outer end disposed between the plate 143 and the cover wall. The screws 144 also secure the filter in place, and if desired, a sealing gasket 147 may be interposed between the cover wall and the flange 146. A restricted bleed opening or orifice 149 connects the interior of filter 145 with enclosing chamber 45.

At ground level when the supercharger 11 is not operating valve 19 is held closed by the action of spring 66, the cabin pressure being equal to the ambient pressure present in chamber 45. The operation of the supercharger, however, creates a head of pressure in cabin 10 of several pounds per square inch above atmospheric pressure and exerts a force upon valve 19 to move it to open position whereupon ventilating air is permitted to circulate through the cabin and to discharge through the valve port 15 as indicated by the arrows in Figs. 1 and 5.

The control unit is so adjusted by selection of isobaric bellows 70 and by the adjustment of spring 94 that valve 78 is maintained in open position in the presence of pressures within chamber 45 above the pressure found at a predetermined altitude, as for example 8000 feet. As the aircraft ascends, however, the pressure in chamber 45 decreases, it being open to the ambient through valve 78, and bellows 70 expands to effect a gradual closing of the valve. Air under pressure is introduced constantly into chamber 45 through the conduit 135 and the orifice 149. So long as the pressure in chamber 45 exceeds the predetermined pressure valve 78 and its controlling bellows 70 perform no function to maintain the pressure in the chamber but upon that pressure decreasing to the predetermined value the valve is closed to an extent that the permitted flow of escape air to atmosphere is just equal to the flow of incoming air through conduit 135 and orifice 149. It is the function of bellows 70 to maintain the pressure of chamber 45 at the predetermined value in normal pressurized flight throughout what is called the isobaric range and independently of further increases in altitude with corresponding decrease in the ambient pressure. This pressure is used as a reference pressur acting upon the outside of valve 19 and is opposd by cabin pressure acting on the opposite side of the valve.

The reference pressure in chamber 45 is maintained constant throughout the isobaric range by allowing a flow of air under pressure to enter through conduit 135 and orifice 149 and allowing an amount to escape to the ambient atmosphere through metering valve 78. An increase in chamber pressure causes the bellows 70 to contract whereupon valve 78 allows more air to escape to atmosphere and thus reduce the chamber pressure to normal. A lesser pressure causes the bellows 70 to expand whereupon less air escapes to atmosphere and an increase in chamber pressure is effected. As the mechanism is very sensitive to pressure variations substantially a constant pressure is provided throughout the isobaric range upon the chamber side of the valve. Accordingly, any variation in cabin pressure acting upon the cabin side of the valve will cause a corrective valve movement to take place. If cabin pressure tends to increase valve 19 will be forced open to a greater extent through permitting the excessive pressure to escape. Similarly a tendency toward a decrease in cabin pressure permits the pressure in chamber 45 to move the valve toward its closed position thereby reducing the outflow from the cabin to the ambient atmosphere whereupon the pressurizing means are enabled to increase the pressure.

As the force of expansion of isobaric bellows 70 which effects the closing of valve 78 is supplemented by the tension in spring 94 it is possible by adjusting that tension to cause the bellows to assume different positions for a given pressure acting thereon within chamber 45. That is, the isobaric range within which the bellows will control the cabin pressure can be shifted upwardly or downwardly.

Throughout the isobaric range the pressure within the cabin will be maintained in the manner just described. The upper limit of that range is determined by the pressure differential between cabin and atmospheric pressures reaching a point beyond which it is unsafe to go for structural reasons. Today 30,000 feet can be selected as an example of such height. At this point differential bellows 71 becomes operative and acts to lower the reference pressure in chamber 45 by allowing chamber air to escape past valve 113 to atmosphere. Up to this critical pressure differential atmospheric pressure within bellows 71 supplemented by the tension of spring 128 had been adequate to hold valve 113 in closed position upon its seat 115 against the opening force provided by the chamber pressure acting on the exterior of the bellows supplemented by the force of coil spring 121. The decrease of the atmospheric pressure within the bellows, however, enables the opening forces to open the valve and retain it open until the closing forces are again able to close it. The effect of this operation is to prevent the pressure in chamber 45 from exceeding the ambient pressure by more than a predetermined maximum differential. Correspondingly, and as valve 19 moves in the open direction with decrease in chamber pressure, the cabin pressure will be reduced with the chamber pressure.

It is to be noted that upon reaching the upper limit of the isobaric range the isobaric bellows 70 continues to position valve 78 in a continuance of its effort to maintain the pressure in chamber 45 at said predetermined level, but that despite this operation the opening of valve 114 by the differential bellows 71 permits the chamber pressure to decrease so that valve 19 opens more widely to effect a decrease in cabin pressure.

With control mechanism, such as shown in Figs. 3 to 6, in the chamber 45 of the outlet valve unit said unit may be used as a master control for controlling a plurality of slave valves of the kind shown in Figs. 1 and 2 which may be located at various parts of the aircraft to eliminate stagnant air pockets. This control by the master unit is effected by connecting the chamber 45 of the master control unit with the chamber 45 of each slave valve units, as by a conduit 160 whereby the reference pressure in the respective chambers 45 will be maintained at the same or at substantially the same value.

The conduits 160 may lead from the chamber 45 of the master unit directly to the chambers 45 of the slave valve units, or, if desired, the various units may have passages through a bolt 13 which passages are suitably connected within the aircraft cabin.

Referring now to Fig. 7, there is shown a schematic or diagrammatic representation of a cabin pressure control system embodying an alternative arrangement of the present invention in which one or more slave units 12 are controlled by a control unit indicated generally by the reference character 175. The cabin 10 is provided with a plurality of openings 16, only one of which is shown in Fig. 7, having an outflow valve 12. The pressure regulating unit is shown generally at 175, and is of the type disclosed in the application of James M. Kemper, Serial No. 710,677, filed November 18, 1946, now Patent No. 2,513,332, to which application reference is here made for an understanding of its structure and operating characteristics. Control unit 175 also functions to control the pressure in chamber 45 of the slave units connected to it and for that purpose is suitably connected thereto as by conduits 176, one of which is illustrated in Fig. 7. The cabin 10 is pressurized by the supercharger 11 so that the valve 19 is, as in the first embodiment, acted upon by cabin pressure upon one of its sides and by the pressure of chamber 45 upon its side. Under the control of unit 175 the various slave units 12 will function to maintain pressure within the cabin in accordance with the operating characteristics of the control unit which of itself forms no part of the present invention. The unbalancing of these pressures so that the pressure on the outer side of the valve member 19 (relative to the cabin) is lower than that on the inner side, the valve will move in the opening direction until the differential of pressures on opposite sides thereof will balance or reach a state of equilibrium; and when said valve is in an open position and the pressure on the inner or cabin side is lower than that on the outer side, the valve will move in the closing direction until seated, or a balance of pressures on the opposite sides thereof is reached.

Whether the valve construction be incorporated in a slave unit as illustrated in Figs. 1, 2 and 7 or in a control unit as illustrated in Figs. 3 to 6 inclusive, it operates with desirable efficiency. The cabin pressure acts upon the cupped side of valve 19, primarily upon the bottom wall 20 thereof. As wall 20 is surrounded by the cylindrical wall 21 the pressure loss which accompanies even a slight opening of an ordinary valve is avoided. The wall 21 prevents the air acting on the valve from rushing radially outward and instead holds it pocketed as the valve moves in the open direction. Additionally the areas upon the opposite sides of the valve acted upon by the actuating pressures are maintained constant as the valve moves outwardly. The only member changing its shape comprises the diaphragm 36 which is rolled between the guide 40 and the cylindrical wall of the Z-sectioned member 24 so that its area exposed to atmospheric pressure and to chamber pressure remain constant. The presence of the bearing supported stem 47 insures a minimum of resistance to valve displacement.

We claim:

1. In a fluid flow control valve for controlling the fluid flow from an opening: a valve seat about said opening in the general form of a truncated cone to provide a sloping seating surface which slopes outwardly away from the region of engagement; a movable valve member in the general shape of a shallow cup and comprising a wall from which a peripheral flange axially extends toward the opening, the free end of said flange being bevelled to provide a relatively sharp inner edge adapted to engage the seat about said opening; means forming a chamber adjacent the side of the wall opposite said opening and having an open end facing said wall; yielding means urging the movable valve member toward closed position; and flexible means connecting said wall with the open end of the chamber to provide a pressure chamber therewith, said flexible means being so constructed and arranged that ambient atmosphere exerts substantially no effective influence thereon, and hence, exerts substantially no effective influence on the positioning of the movable valve member.

2. The invention defined by claim 1, wherein the pressure chamber is connected to a source of pressure.

3. The invention defined by claim 1, wherein the pressure chamber is connected to a source of variable pressure.

4. The invention defined by claim 1, wherein the pressure chamber is connected with a source of controlled pressure.

5. The invention defined by claim 1, wherein the valve wall is provided with an axial stem and there is guide means for said stem permitting axial movement thereof.

6. A fluid flow control valve for controlling the fluid flow from an opening in an aircraft cabin and having a valve seat about said opening, comprising: a movable valve member in the general shape of a shallow cup comprising a wall from which a peripheral flange axially extends toward the valve seat, the free end of said flange being bevelled to provide a relatively narrow inner edge adapted to engage the seat about said opening; means forming a chamber adjacent the side of the wall opposite said opening and having an open end facing said wall, said open end being of smaller area than said wall; a flexible diaphragm connecting said wall with the open end of said chamber, said diaphragm being cylindrical in shape and having one end secured about the flange of the wall and having the opposite end turned inwardly and secured to the open end of said chamber forming means; a cylindrical collar disposed about the cylindrical portion of the diaphragm in outwardly spaced relation to the open end of the chamber; and guide means for the movable valve member for axially guiding same, said diaphragm having a portion which rolls with axial movement of the movable valve member.

7. In an outflow valve for a pressurized aircraft cabin having an outlet opening with a valve seat thereabout, comprising: a movable valve member in the general shape of a cup comprising a wall from which a peripheral flange extends toward the valve seat, the free end of said flange providing a relatively narrow edge adapted to engage the seat about said opening; means forming a chamber adjacent the side of the wall opposite the opening and having an open end facing said wall; flexible means connecting the wall with the open end of the chamber to provide a pressure chamber, said flexible means and movable valve member being so constructed and arranged that ambient atmosphere exerts substantially no effective influence thereon, and hence, exerts no substantially effective influence on said movable valve member; means forming a connection between the pressure chamber and atmosphere; means connecting said pressure chamber with a source of higher pressure; pressure responsive means including a valve controlling one of said openings, and a pressure responsive device responsive to the pressure in said chamber for controlling said pressure; a second connection with atmosphere; and means, including a pressure responsive device, for controlling said second connection, said last-named pressure responsive device being subjected on one side to pressure in said pressure chamber and on the opposite side to atmosphere.

8. A fluid flow control valve for controlling the fluid flow from an opening, comprising: a truncated valve seat about said opening; a movable valve member in the general shape of a shallow cup comprising a wall from which a peripheral flange extends axially toward the valve seat, the free end of said flange being bevelled to provide a relatively sharp edge adapted to engage the seat about said opening, said valve member being at the outlet side of the opening so that the pressure of fluid in said opening urges said valve member in the opening direction; means forming a chamber adjacent the wall opposite said opening and having an open end facing said wall; a flexible diaphragm connecting said wall with the open end of said chamber, said diaphragm being substantially cylindrical in shape and having one end secured about the flange of the wall and having the opposite end secured to the open end of the chamber forming means; and a cylindrical collar disposed about the cylindrical portion of the diaphragm in outwardly spaced relation to the open end of the chamber.

9. In an outflow valve for an enclosure having an opening and a valve seat thereabout: a movable valve member comprising a wall from which a flange extends toward the valve seat, the free end of said flange comprising a relatively narrow edge adapted to engage the seat about said opening; means forming a chamber adjacent the side of the wall opposite the opening and having an open end adjacent said wall; flexible means connecting the wall with the open end of the chamber to provide a pressure chamber, said flexible means and said flange having opposed surfaces exposed to the same air outside said chamber in order that such air exerts substantially no effective influence in a direction tending to open or close said valve member; and means for controlling the pressure in said chamber to thereby control said movable valve member.

10. In an outflow valve for an enclosure having an opening and a valve seat thereabout: a movable valve member comprising a wall from which a flange extends toward the valve seat, the free end of said flange comprising a relatively narrow edge adapted to engage the seat about said opening; means forming a chamber adjacent the side of the wall opposite the opening and having an open end adjacent said wall; flexible means connecting the wall with the open end of the chamber to provide a pressure chamber, said flexible means and said flange having opposed surfaces exposed to the same air outside said chamber, the effective areas of said opposed surfaces tending to open and close said valve member being substantially equal to thereby substantially cancel any tendency for the pressure of such air to open or close said valve member; and means for controlling the pressure in said chamber to thereby control said movable valve member.

11. In a fluid flow control valve for an enclosure having an opening therein and a valve seat about said opening: a movable valve member comprising a wall from which a peripheral flange extends toward the valve seat, the free end of said flange comprising a relatively narrow inner edge adapted to engage the seat about said opening, and providing an area subjected to pressure outside said enclosure tending to move said movable valve member away from said seat; means forming a chamber adjacent the side of the wall opposite the opening and having an open end facing said wall; flexible means connecting the wall with the open end of the chamber to provide a pressure chamber, said flexible means having a peripheral portion subjected to pressure outside the enclosure urging the movable valve member toward said seat to substantially balance the pressure on the flange urging the valve away from the seat; and means for controlling the pressure in said chamber.

ROBERT A. ARTHUR.
JAMES M. KEMPER.

REFERENCES CITED

The following references are of record in the file of this patent:

UNITED STATES PATENTS

| Number | Name | Date |
|---|---|---|
| 1,680,750 | Smoot | Aug. 14, 1928 |
| 1,901,805 | Feeley | Mar. 14, 1933 |
| 2,402,681 | Schroeder | June 25, 1946 |
| 2,441,088 | Teague | May 4, 1948 |
| 2,441,089 | Teague | May 4, 1948 |
| 2,436,183 | Snedecor | Feb. 17, 1948 |
| 2,450,881 | Cooper et al. | Oct. 12, 1948 |

FOREIGN PATENTS

| Number | Country | Date |
|---|---|---|
| 563,553 | Great Britain | Aug. 21, 1944 |